3,002,809
METHOD OF MANUFACTURE OF HIGH PURITY SODIUM ALUMINATE

Alfred O. Walker, Westchester, Ill., assignor to Nalco Chemical Company, Chicago, Ill., a corporation of Delaware
No Drawing. Filed June 22, 1959, Ser. No. 821,628
3 Claims. (Cl. 23—52)

This invention relates to a new method for manufacturing high purity sodium aluminate directly from bauxite.

There have been many attempts to directly manufacture sodium aluminate from bauxite ores. These processes require multiple processing steps to produce a finished product. In order to produce pure sodium aluminate, that is, sodium aluminate of at least 99% by weight purity and having less than 1 percent of silica and organic contaminants, it has been necessary to employ relatively pure grades of alumina. When pure alumina is used to make sodium aluminate, the cost is relatively high.

In accordance with the invention, it has been found that pure sodium aluminate may be manufactured from bauxite ores using the following manufacturing steps. As will be obvious from the following explanation, the process is basically a "wet" type manufacturing technique.

(1) Bauxite ore is added to a boiling aqueous solution which contains between 45% to 70% by weight of sodium hydroxide. The temperature of the caustic solution should be at least 260° F. to 285° F. The bauxite is added with agitation which is maintained constant to uniformly disperse and maintain the bauxite in suspension. The reaction of the alumina in the bauxite with the hot caustic solution will be complete within a period of time ranging from several minutes to not longer than several hours. During this time the red mud is uniformly suspended in the liquor. As a general rule, higher temperatures will more rapidly cause a reaction to occur.

(2) The bauxite and caustic when added as in step 1 produce a liquor having a specific gravity of between 1.600 and 1.850. At this point, water is added to the liquor to adjust the specific gravity to between 1.300 and 1.550.

(3) At this point in the process, between .5% but not more than 1% by weight of carbonaceous filter aid is added to the diluted liquor prior to the liquor being subjected to the filtration operation. This step is optional yet desirable.

(4) The carbon-treated, dilute liquor is now fed to a pressure filter, preferably a leaf-type pressure filter under a pressure of at least 25 pounds per square inch gauge. The pressure is preferably maintained at 60 pounds to not more than 100 pounds per square inch during the filtration operation. The temperature of the liquor going to the filters is preferably within the range of 200 to 230° F.

The screen in the filter may be subject to some variation and may be made of fine mesh substances which would not be reacted with alkaline aluminate liquor. The screen size should be sufficiently small to hold the filter cake which forms from the red mud which is retained on the filter screening. A typical filter screen which may be used is stainless steel backed nylon filter cloth having 52 x 36 threads per inch.

(5) As the liquor passes through the filter, the first portion coming through the outlet is discarded. The particular quantity of liquor discarded at the beginning of the filter run is usually between 1% and 3% by weight and will never exceed 5% by weight. This so-called discarded portion may advantageously be recycled in subsequent manufacturing operations. As the filter run commences, the red mud and suspended insoluble impurities contained in the liquor build up on the screen of the filter and form a filter media which is extremely efficient in removing the suspended impurities from the liquor being filtered.

As previously indicated, a carbon filter aid is added to the liquor prior to filtration which aids in the formation of a uniform filter cake and also acts as a base media for the filter coat which allows the filter coat to be removed from the filter after the filtration run has been completed.

While the carbon filter aid may be added to the aluminate liquor, it may be applied to the filter screen using several methods. In a preferred embodiment, the carbonaceous filter aid is slurried in a small amount of water and/or into a small amount of the diluted aluminate liquor and pre-coated onto the filter prior to the filtration run.

(6) The effluent liquor (filtrate) is usually dark amber in color and contains minor amounts of suspended organic coloring matter. This coloring matter is readily bleached to a colorless form from the filtrate by treating the liquor with between .1% and 1.5% by weight of an inorganic bleaching agent which may be suitably selected from such chemicals as alkali metal hypochlorites, gaseous chlorine, or aqueous solutions of hydrogen peroxide having concentrations of at least 30% by weight.

The bleaching operation is preferably conducted at a temperature ranging from 230° to 260° F.

(7) After the liquor has been bleached, it will then be subjected to conventional drying operations. In the case of drum drying, it is preferable that the dilute liquor be concentrated to a gravity of at least 1.600. In a preferred embodiment it is preferred to add to the dilute liquor, stabilizing quantities ranging from 1 to 5% by weight of a sodium aluminate stabilizer of the type described in Lindsay et al. U.S. 2,345,134, based on the weight of the solids in the liquor.

The finished sodium aluminate produced in accordance with the above procedures are of extremely high chemical purity and may be considered as being 99% or more pure. A typical analysis of the products produced in accordance with the invention is as follows:

| | |
|---|---|
| Color | White. |
| Odor | None. |
| Max. solubility at 75° F | 80 parts in 100 parts water. |
| Density | 50 lbs./cu. ft. |
| Insoluble | Less than 0.2%. |
| $Na_2O/Al_2O_3$ molecular ratio | 1.15:1, slightly hygroscopic. |
| $Al_2O_3$, percent | 46.0. |
| $Na_2O$, percent | 31.0. |
| Fe, percent | <0.01. |
| Ca and Mg, percent | Negative. |
| Si, percent | 0.6. |
| Heavy metals, percent | Negative. |
| As, percent | Negative. |

The starting bauxite should have an alumina content of at least 57% by weight and should be relatively low in such ingredients commonly found in ores such as silica, titania, iron oxide, calcium oxide, and magnesium oxide.

For purposes of illustration, several typical bauxite ores that may be used in the process of the invention, in terms of their major constituents, are listed below in Table I:

TABLE I

| Country: Locality | Constituents, percent | | | | | |
|---|---|---|---|---|---|---|
| | $Al_2O_3$ | $SiO_2$ | $TiO_2$ | $Fe_2O_3$ | CaO MgO | $H_2O$ |
| United States: Arkansas, Saline County | 58.60 | 2.34 | | 9.11 | | 28.68 |
| British Guiana: Yarikita River | 64.38 | 2.73 | .10 | .50 | | 32.29 |
| India: Jubbulpore Dist | 57.15 | 2.00 | 8.60 | 2.75 | | 29.13 |
| France: | | | | | | |
| Herault | 58.6 | .8 | 2.80 | 26.2 | | 21.1 |
| Var | 57.6 | 2.80 | 3.10 | 26.30 | .40 | 10.8 |
| Italy: | | | | | | |
| Abruzzo | 57.50 | 2.79 | 1.27 | 26.55 | | 11.71 |
| Campagna | 58.40 | 1.27 | | 24.12 | | 13.11 |
| Yugoslavia: Dalmatia | 57.85 | .89 | | 26.82 | | 19.97 |
| Surinam: Surinam River | 64.6 | 1.20 | | 1.2 | | 31.8 |
| Gold Coast | 59.05 | .62 | 1.66 | 12.19 | | 26.47 |

A preferred starting bauxite is the ore of the type deposit found near the Surinam River in South America. A more detailed analysis of this ore is presented below:

Typical analysis $Al_2O_3$ ------------------ 61%–62%, 60% min.
$Fe_2O_3$ ------------------ 1.5%–2.0%, 2% max.
$TiO_2$ --------------------- 2.8%–3.2%.
$SiO_2$ --------------------- 1.8%–2.2%.
Loss on ignition ($H_2O$ and organic) ----------------- 31%–32%.
Free moisture ------------ 2% or less, 3% max. (penalty calculated on excess over 3% $H_2O$).

The above represents an alumina segment of the entire deposit; hence the slight discrepancy from the prior general analysis.

While any good grade of filter carbon may be used in the filtration step, it is preferred to use a material of the type sold to the trade under the trade name of Nerofil which contains approximately 6% by weight of asbestos and has the following specifications:

Specifications (a) Iron ----------- Neg.
(b) Silicon -------- 6 p.p.m.
(c) Aluminum ----- 5 p.p.m.
Screen sizing ----- {+150 mesh 14–18%. −325 mesh 40–52%.
Volatile ----------- 2% typical.
Packaging -------- {50# 3-ply bags. Size: 20½″ x 5″ x 40″. Type: P.E. lined printed kraft.
pH --------------- 6.5–7.5.
Ash -------------- 4–5%.
Moisture --------- Approx. 8%.
Typical cake density -- 16–18#/ft.
Flowrate --------- 140–170 vs. 7C standard.
Clarity ----------- Approx. 50 minimum vs. 7C standard.

Wettable to aqueous and non-aqueous solutions.

Other carbonaceous filter grades of carbon may also be used.

For purposes of illustrating the invention, the following is given by way of example.

EXAMPLE

To a 49% solution of sodium hydroxide was added 156 grams of bauxite. The reaction temperature was 280° F. and uniform agitation was maintained for a period of ten minutes at which time the alumina had reacted with the caustic and the red mud had become uniformly suspended throughout the reaction mass. The specific gravity of this cook was 1.600. The product had an $Na_2O/Al_2O_3$ ratio of 1.20:1. At this point Chicago tap water was added to the liquor to dilute the product down to a gravity of 1.500.

The product was then filtered through a laboratory filter constructed of large diameter iron piping fitted with a stainless steel screen upon which was impressed a nylon filter cloth of the type previously described. Just prior to the filtration, 1% by weight of Nerofil R was slurried onto the filter to form a filter cake. The liquor entered the filter at a temperature of 200° F. and the pressure was adjusted to 40 pounds per square inch gauge. The filtration rate was approximately 7.6 pounds/hour square foot. The initial 3% of the run was collected and discarded. The remainder of the filtrate was collected and treated with 3% by weight of a 15% solution of sodium hypochlorite. The color, NPA, was reduced after the hypochlorite had reacted with the organic matter, 36%. The bleached liquor was nearly colorless.

The filtered and bleached liquor was concentrated to a gravity of 1.600 and was drum dried on a small laboratory drum dryer, the temperature of which was 150° C. Prior to filtration 1% by weight of sorbitol was added based on the weight of the solids in the liquor. Analysis of this product showed the material to have a sodium aluminate content which includes combined water and excess sodium oxide of 99% by weight.

The percent of excess caustic used in the starting cook is normally at about 15% and should never exceed 20% by weight. This excess refers to the molar or combining excess and is a commonly used expression for indicating the excess amount of caustic used in producing sodium aluminates. Based on this quantity of excess caustic, the finished sodium aluminates of this invention have a molecular ratio range from 1.11:1 to 1.25:1 with the preferred molecular ratio being 1.15:1 to 1.23:1.

Perhaps the most important feature of the invention is the use of the suspended red mud as the filter medium. For some unexplainable reason this step allows a purer filtrate to be produced which in turn permits the subsequent production of a very high purity sodium aluminate.

The invention is hereby claimed as follows:

1. The process of producing sodium aluminate from bauxite which comprises the steps of heating a 45% to 70% by weight solution of sodium hydroxide to a temperature of at least 275° F., adding thereto with agitation a bauxite which contains at least 57% by weight of alumina to produce a reaction mass having a $Na_2O$ to $Al_2O_3$ ratio between 1.11:1 to 1.25:1, continuing the process whereby the alumina present in the bauxite is substantially converted to sodium aluminate and the insoluble impurities contained in the bauxite are uniformly suspended throughout the reaction mass, said aluminate liquor having a specific gravity of between 1.600 and 1.850, diluting to a specific gravity between 1.300 and 1.500, filtering the diluted liquor in the presence of not more than 1% by weight of carbon filter aid at a pressure of at least 25 pounds per square inch gauge, discarding not more than the first 5% of filtrate and adding to the filtered liquor between .1% and 1.5% by weight of an inorganic bleach from the group consisting of alkali metal hypochlorite, chlorine, and hydrogen peroxide and then drying the product.

2. The process in accordance with claim 1 where the carbon filter aid is slurried onto the filter in the form of a precoat.

3. The process of claim 1 where the starting caustic solution contains 50% by weight of sodium hydroxide, the $Na_2O$ to $Al_2O_3$ ratio is between 1.11:1 and 1.23:1, the product having a concentrated gravity of 1.600 and is diluted to a gravity of between 1.450 to 1.500 prior to filtration with the carbon aid being precoated onto the filter prior to passing the liquor through the filter.

References Cited in the file of this patent

UNITED STATES PATENTS

| | | |
|---|---|---|
| 1,271,192 | Melick | July 2, 1918 |
| 1,747,759 | Dorr et al. | Feb. 18, 1930 |
| 2,066,209 | Lurie | Dec. 29, 1936 |
| 2,143,310 | Fulda et al. | Jan. 10, 1939 |
| 2,345,134 | Lindsay et al. | Mar. 28, 1944 |
| 2,869,984 | Spence | Jan. 20, 1959 |

OTHER REFERENCES

Hassler: "Active Carbon," Chemical Publ. Co., Inc., 1951, pages 156–160.